(12) United States Patent
Mack et al.

(10) Patent No.: US 12,555,421 B2
(45) Date of Patent: Feb. 17, 2026

(54) SCANNER FOR MONITORING THE RELIABILITY OF SYSTEMS

(71) Applicant: International Engine Intellectual Property Company, LLC, Lisle, IL (US)

(72) Inventors: Alex Mack, Hinsdale, IL (US); Paul Berke, Chicago, IL (US); Steven Mieland, Wheaton, IL (US); Andrei Makartchouk, Hinsdale, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 321 days.

(21) Appl. No.: 17/948,759

(22) Filed: Sep. 20, 2022

(65) Prior Publication Data

US 2024/0096147 A1    Mar. 21, 2024

(51) Int. Cl.
*G07C 5/08* (2006.01)
*G07C 5/00* (2006.01)

(52) U.S. Cl.
CPC .......... *G07C 5/0816* (2013.01); *G07C 5/006* (2013.01); *G07C 5/008* (2013.01); *G07C 5/0808* (2013.01); *G07C 5/085* (2013.01)

(58) Field of Classification Search
CPC ...... G07C 5/0816; G07C 5/006; G07C 5/008; G07C 5/0808; G07C 5/085
See application file for complete search history.

(56) References Cited

U.S. PATENT DOCUMENTS

| | | | |
|---|---|---|---|
| 6,430,486 B1 | 8/2002 | Diaz et al. | |
| 11,922,740 B2* | 3/2024 | Edren | G07C 5/008 |
| 2005/0060323 A1 | 3/2005 | Leung et al. | |
| 2006/0064291 A1* | 3/2006 | Pattipatti | G05B 23/0251 703/14 |
| 2008/0319599 A1 | 12/2008 | Ptak et al. | |
| 2010/0023203 A1* | 1/2010 | Shibi | G07C 5/0808 701/31.4 |
| 2010/0121609 A1* | 5/2010 | Gorinevsky | G05B 23/0281 702/183 |
| 2017/0249844 A1* | 8/2017 | Perkins | G06V 20/59 |
| 2017/0287233 A1* | 10/2017 | Nix | G08G 1/166 |
| 2019/0385387 A1* | 12/2019 | Davidson | G07C 5/008 |
| 2022/0180673 A1* | 6/2022 | Abraham | F02M 26/02 |
| 2025/0083660 A1* | 3/2025 | Frazier | B60W 10/06 |

FOREIGN PATENT DOCUMENTS

WO    2022/026079 A1    2/2022

OTHER PUBLICATIONS

International Search Report and Written Opinion for PCT/US2023/028454, dated Nov. 6, 2023 (12 pages).

* cited by examiner

*Primary Examiner* — Toya Pettiegrew
(74) *Attorney, Agent, or Firm* — Mark C. Bach; Umang Khanna

(57) ABSTRACT

A scanner monitors a vehicle engine module's performance, such as, for example, a vehicle engine powertrain by creating and compiling performance data either in real time or based on a data post-processing schedule. A preventive maintenance or repair is suggested if the critical boundaries of a probable failure are reached.

8 Claims, 3 Drawing Sheets

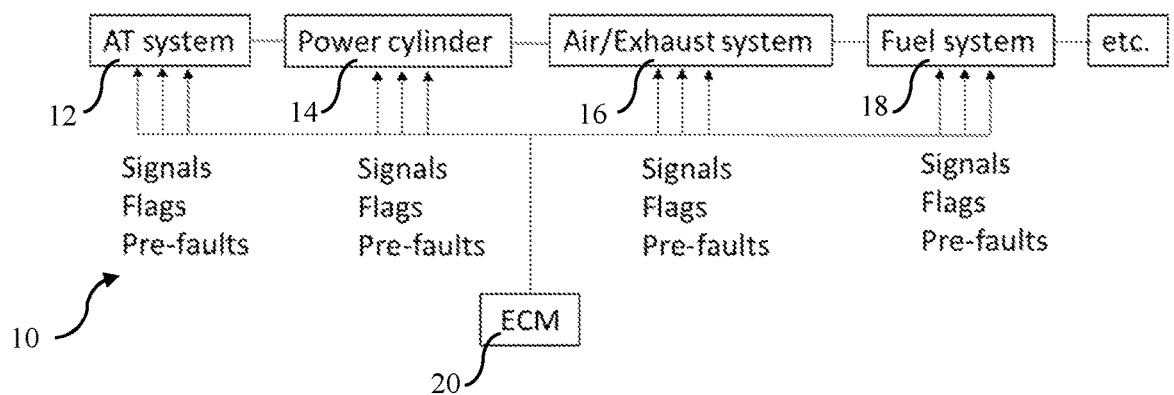
FIG. 1
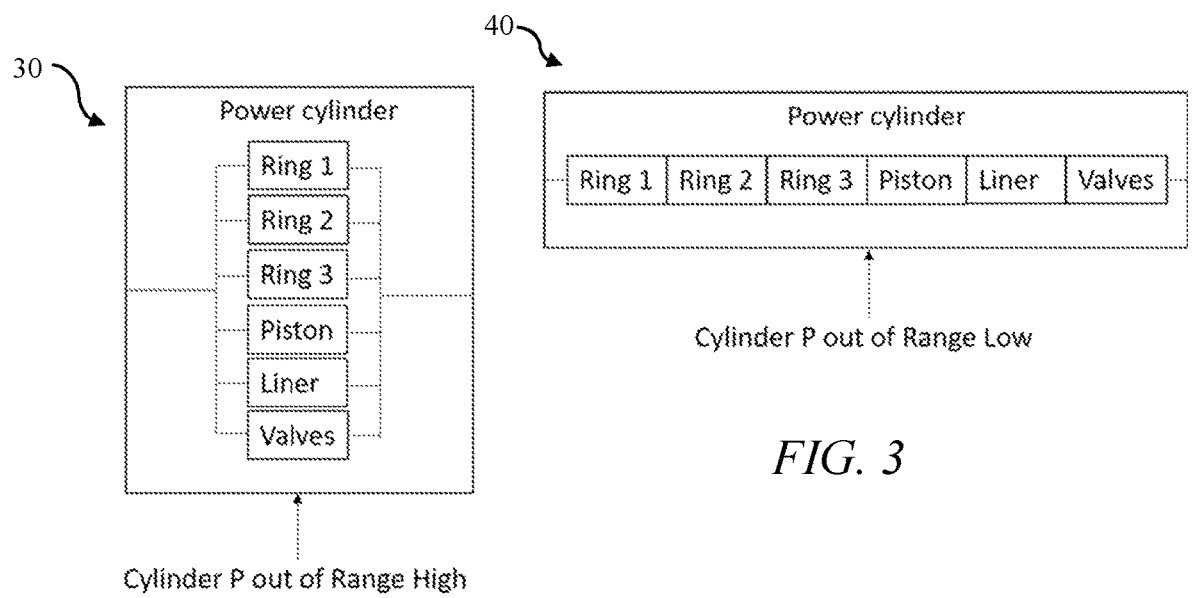
FIG. 2
FIG. 3

SCANNER FOR MONITORING THE RELIABILITY OF SYSTEMS

TECHNICAL FIELD

A scanner monitors a system's performance, such as, for example, conventional, hybrid, or electric vehicle powertrains using sensors and/or on-board diagnostic (OBD) capacities by creating and compiling performance data either in real time or based on a data post-processing schedule. A preventive maintenance or repair is suggested if the critical boundaries of a probable failure are reached.

BACKGROUND

Vehicle systems, such as vehicle powertrains have many components that fail over time. Failure of the components of the systems may lead to malfunction or failures of the entire system, requiring maintenance and/or repair.

In many cases, however, repairs occur only after a system, such as a powertrain, has failed. Often, unscheduled repairs and/or maintenance may pull a vehicle out of service that is not predicted, making it difficult to efficiently manage the scheduling of a fleet of vehicles.

Vehicle control modules, such as engine control modules ("ECMs") often include many sensors or other sensing or monitor means or diagnostic tools, such as OBD tools, that are utilized to monitor various components of a vehicle's system, such as, its powertrain. The sensors or other sensing or monitoring means or diagnostic tools often provide data that is compiled in a database that tracks the performance quality of the various components. However, while failure of specific components may be tracked and compiled, there is no solution, heretofore, for using the data generated by the sensors or other sensing or monitoring means to predict failures of the systems before they occur.

A need, therefore, exists for improved predictive maintenance tools for systems, namely vehicle systems, such as, for example, vehicle powertrains. Specifically, a need exists for improved predictive maintenance tools that may predict system failure before it occurs. More specifically, a need exists for improved predictive maintenance tools that scan compiled data for predicting system failures.

Moreover, a need exists for improved predictive maintenance tools that are easy to implement without requiring significant hardware upgrades. Specifically, a need exists for improved predictive maintenance tools that utilize existing sensors and data created thereby. More specifically, a need exists for improved predictive maintenance tools that may operate in real-time or on data post-processing schedules.

SUMMARY

One embodiment of a method for determining reliability of a system comprises providing a system comprising a plurality of components; providing a diagnostic tool and monitoring the plurality of components of the system for reliability of each of the plurality of components; compiling reliability data of each of the plurality of components from the diagnostic tool; grouping the plurality of components into a plurality of groups; and providing a scanner and scanning the reliability data of the plurality of components, assigning an input parameter to each of the plurality of components based on the reliability data, determining a reliability factor for each of the plurality of groups based on the input parameter of each of the components within each of the groups, and determining a possibility of failure of the system based on the reliability factors of each of the plurality of groups.

BRIEF DESCRIPTION OF THE DRAWINGS

FIG. 1 is a diagram illustrating systems of a vehicle powertrain monitored by an engine control module in an embodiment described herein;

FIG. 2 is a diagram illustrating components of a power cylinder arranged and connected in a parallel configuration in an embodiment described herein;

FIG. 3 is a diagram illustrating components of a power cylinder arranged and connected in a serial configuration in an embodiment described herein;

DETAILED DESCRIPTION

Figure 4:
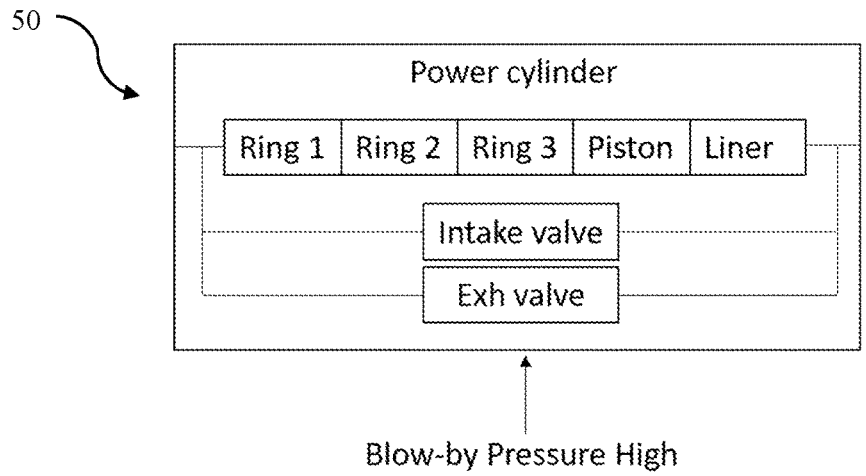
FIG. 4 is a diagram illustrating components of a power cylinder arranged and connected in a combination of parallel and serial configurations in an embodiment described herein.

A scanner monitors a system's performance, such as, for example, conventional, hybrid, or electric vehicle powertrains using sensors and/or on-board diagnostic (OBD) capacities by creating and compiling performance data either in real time or based on a data post-processing schedule. A preventive maintenance or repair is suggested if the critical boundaries of a probable failure are reached.

Many vehicles, such as all currently produced Navistar® vehicles, are equipped with powertrain control modules, such as, for example, engine control modules (ECMs), on-board diagnostic (OBD) systems, or other like diagnostic tools that may read and compile performance data of the vehicles' powertrains and components thereof. The compiled performance data is then typically transmitted via telematic systems to a database. Often, as noted above, repairs and maintenance of the vehicles is not done until critical failures occur in the components, sub-systems, or the powertrain as a whole.

A scanner may be provided for scanning the compiled data and monitoring the reliability of the components of the powertrains or other systems. In an embodiment, the scanner specifically monitors the reliability of components and/or systems of the vehicles' powertrains. The scanner, generally, scans the compiled data in the stored database or databases, either in real-time or based on a post-processing schedule. The scanner further may suggest maintenance and/or repair of the vehicles' systems, specifically, for example, in the vehicles' powertrains, if the critical boundaries of a probable failure are reached. Thus, critical failures or issues in the vehicles' systems may then be prevented in advance.

The scanner disclosed herein may be any software and/or hardware components that may function as described herein and may be disposed as an integral part of a control module, such as in a powertrain control module, in an ECM, a connected module to the control module, or in any other capacity tied or connected to the control module. Alternatively, the scanner disclosed herein may be integrated into the database at a remote database center, or a standalone module or unit tied or otherwise connected to and provided access to the database at the remote database center.

The scanner, generally, determines the reliability of a mechanism, or its components, or its groups of components within a system, such as a vehicle powertrain, for example. It should be noted that the scanner described herein is used in an exemplary embodiment of vehicle systems, such as vehicle powertrains and may be utilized for conventional powertrains, hybrid powertrains, or electric powertrains. However, the scanner may be useful for any system having a plurality of components for which reliability data of individual components thereof may be generated and compiled.

Generally, the reliability of the entire system may be determined by first determining a reliability of each component within a group of components within the system, then determining a reliability of the group of components based on the reliability of the components, then determining a reliability of the system based on the reliability of all groups, then calculating a probability of failure of the system. The probability of failure of the system may be compared against a pre-defined critical failure level and a decision may be made based on the comparison of the probability of the failure of the system against the pre-defined critical failure level.

Specifically, the reliability of the mechanism or group of components within a system may be a function of the reliability of all of the components and is determined by mathematical multiplication of the element's probable reliabilities $P_j$:

$$\prod_{j=1}^{m} P_j \quad \text{(Equation 1)}$$

where:

m=number of components in the group;

$P_j$=reliability of each component in the group.

For example, if a single component of 100 components in a group failed during T hours (for example over 10,000 hours) then a probable reliability (P(T), where $T=10^4$) for this group is $P_j(10^4)=(100-1)/100=0.99$.

This P(T) reliability of the mechanism or a group of components is, therefore, a function of:

m=number of components in the group;

j=the identity of each specific component;

$P_j$=reliability of each specific component in the group; and n=the input parameter that could be represented by a signal, flag, pre-fault, and any other output readings from the ECM, as shown below in Table 1.

The system, such as, for example, the vehicle's powertrain, preferably has performance data that may be generated and/or compiled by a control module, such as an ECM, or otherwise sensed or monitored via other sensing or monitoring systems, such as OBD systems for each component thereof. The components may then be split up and grouped to the sub-system, system, or other group level, preferably based on their functional integrity. For example, a sub-system, system, or group of components 10 is illustrated in FIG. 1, and may include, for example, an after-treatment system ("AT system") 12, a power cylinder group 14, an air/exhaust system group 16, a fuel system group 18, or any other system or sub-system of a vehicle apparent to one of ordinary skill in the art. Each of these systems or groups may be controlled and monitored/scanned by a control module 20. Thus, the complex multiple systems of vehicles having a plurality of components may be analyzed and split into group, thereby simplifying the analysis thereof.

Performance data for each component may then be sensed and compiled for each sub-system or group of components. Specifically, all associated pre-faults, signals, and flags for each component of each group that is normally measured or sensed by the control module, such as an ECM, and/or OBD system, or other like diagnostic tool, may be indicated and assigned as specific external inputs for each group, as shown in FIG. 1. For example, performance data for a power cylinder group of a vehicle's powertrain is illustrated below in Table 1:

TABLE 1

| Component, j | Component name | Input parameters, k | | | | Reliability $P_j$ |
| | | Out of Range Signal #1 ($k_1$) | Out of range signal #2 ($k_2$) | Signal Level #1 ($k_3$) | Pre-Fault # n ($k_n$) | |
|---|---|---|---|---|---|---|
| 1 | Piston | 0 | 1 | 1 | — | 1 | 0.99 |
| 2 | Piston ring #1 | 1 | 1 | 0 | — | 0 | 0.95 |
| 3 | Piston ring #2 | 1 | 1 | 0 | — | 0 | 0.95 |
| 4 | Piston ring #3 | 1 | 1 | 0 | — | 0 | 0.95 |
| 5 | Cylinder liner | 1 | 0 | 1 | — | 1 | 0.94 |
| 6 | Intake valve | 0 | 0 | 1 | — | 0 | 0.99 |
| — | — | — | — | — | — | — | — |
| m | Component #m | 0 | 1 | 1 | — | 1 | 0.99 |

In the matrix shown in Table 1, if a specific parameter (k) in the associated column does not lead to failure of the associated component (j), then the box associated to this component in the matrix may be filled with a zero (0). In simple terms, if a specific out-of-range signal has no effect on the operation of some specific component (i.e., if it cannot lead to the malfunction or failure of that specific component), then the setting is zero (0) and, therefore, the reliability of the component increases by the following amount, for example:

For example,

| 1 | Piston | 0 | 0.99 |
|---|---|---|---|

$\Delta P_j = (1-P_j) = 0.01$

So, the $P_k(T)$ for any specific component as a function of time may be solved according to Equation 2:

$$P_k(T) = P_j + \Delta P_j = P_j + (1 - P_j) = P_j\left[1 + \frac{(1 - P_j)}{P_j}\right] \quad \text{(Equation 2)}$$

Solving the entire matrix of Table 1 with a single equation that would include all columns may be very complex. Thus, to simplify the calculations, each column of Table 1, which may represent a specific input parameter (k), may be separately calculated. Therefore, the equation for the probable reliability for each specific input parameter (k) for each specific column of a group of components may be:

$$P_k(T) = \prod_{j=1}^{m} P_j\left[1 + \frac{(1 - P_j^v)}{P_j}\right] \quad \text{(Equation 3)}$$

where:

$P_j^v$ is specific to the setting (0 or 1) for each component; and 0 or 1 is set in the vertical column k of the matrix (of Table 1, for example).

If each input parameter (k) in the associated column does not lead to the failure of the associated component, then the setting is zero (0) and then v=0 and $P_j^{v=0}=P_j$ of that specific component. If input parameter (k) in the associated column leads to the failure of the associated component, then the setting is one (1) and then v=1 and then $P_j^{v=1}=1$.

Below is an exemplary calculation for the first column (signal k=$k_1$) of the matrix shown above in Table 1:

$P_{k=1} = \left\{0.99*\left[1 + \frac{0.01}{0.99}\right]\right\}*0.95*0.95*$ $0.95*0.94*\left\{0.99*\left[1 + \frac{0.01}{0.99}\right]\right\}*\left\{0.99*\left[1 + \frac{0.01}{0.99}\right]\right\} =$ $\{0.99*[1 + 0.010101]\}*0.95*0.95*0.95*0.94*$ $\{0.99*[1 + 0.010101]\}*\{0.99*[1 + 0.010101]\} =$ $0.99*1.010101*0.95*0.95*0.95*0.94*0.99*$ $1.010101*0.99*1.010101 = 0.805$ Similar calculations may then be made for each input parameter (k), specifically for each input in all columns (k). The following equation can then be utilized to calculate the reliability of the entire system, subsystem, or group:

$$P(T) = \prod_{k=1}^{k} P_k \quad \text{(Equation 4)}$$

Finally, the percentage possibility of failures of a system, sub-system, group, or component will fail is defined as:

$$Q(T) = 1 - P(T)*100 \quad \text{(Equation 5)}$$

For example, Table 2, below, provides an exemplary chart of $P_k$ values from several columns (k) of a system, sub-system, or group and the overall possibility of failure of the system, sub-system, or group.

TABLE 2

| Signal K (columns of Matrix) | $K_1$ | $K_2$ | $K_3$ | $K_4$ |
|---|---|---|---|---|
| $P_k$ | 0.805 | 0.851 | 0.912 | 0.921 |
| P(T), Probable Reliability | $P(T) = P_{k1}*P_{k2}*P_{k3}*P_{k4} = 0.575$ | | | |
| Q(T), Possibility of Failure | $Q(T) = [1 - P(T)]*100 = 42.5\%$ | | | |

Critical boundaries for Q(T) and vehicle maintenance may be defined, such that one may compare the Q(T), possibility of failure, calculated to a threshold value $Q(T)_{critical}$ to make a determination whether the vehicle should be repaired or maintained. In other words, the following equation may help dictate whether repair or maintenance of the vehicle is required:

$$Q(T) \geq Q(T)_{critical} \quad \text{(Equation 6)}$$

Specifically, if Q(T) is greater than or equal to $Q(T)_{critical}$, then a determination that the vehicle should be taken in for repair or maintenance may be made.

In generating the matrix for calculating various $P_k$ values of the groups of components, as illustrated in Table 1, above, and then calculating Q(T) therefrom, each of the components within the defined group may be connected in a special manner, according to the following rules.

If the failure of some specific component in the group cannot be potentially set by the specific (k) parameter, then in the diagram for this specific parameter, this component should be linked in parallel with the other components, as illustrated in FIG. 2, which shows a schematic 30 of the various components of a power cylinder of an engine powertrain, namely Ring 1, Ring 2, Ring 3, Piston, Liner, and Valves of the power cylinder group connected in parallel to one another. In Table 1, the various (k) settings of these parallel components may later be set to zero (0) in such a case.

If the failure of a specific component in the group an be potentially set by the specific (k) parameter, then in the diagram for this specific parameter, this component should be linked in series to the other components, as illustrated in FIG. 3, which shows a schematic 40 of the various components of a power cylinder of an engine powertrain, namely Ring 1, Ring 2, Ring 3, Piston, Liner, and Valves of the power cylinder group connected in series to one another. In Table 1, the various (k) settings of these serial components may be later set to one (1).

There may be a mix of components within the same groups, with some components linked in parallel and some components linked to each other in series. For example, such a system is illustrated in FIG. 4 for "Blow Pressure High," showing a schematic 50 of various components, namely Ring 1, Ring 2, Ring 3, Piston, and Liner connected to each other in series, and Intake Valve and Exh Valve connected in parallel to Ring 1, Ring 2, Ring 3, Piston, and Liner.

The matrix, an exemplary embodiment of which is illustrated in Table 1, may be created and the (k) values filled in via the review of the ECM data for each component and/or depending on how each component is connected, either in parallel or in series, as described above.

Figure 5:
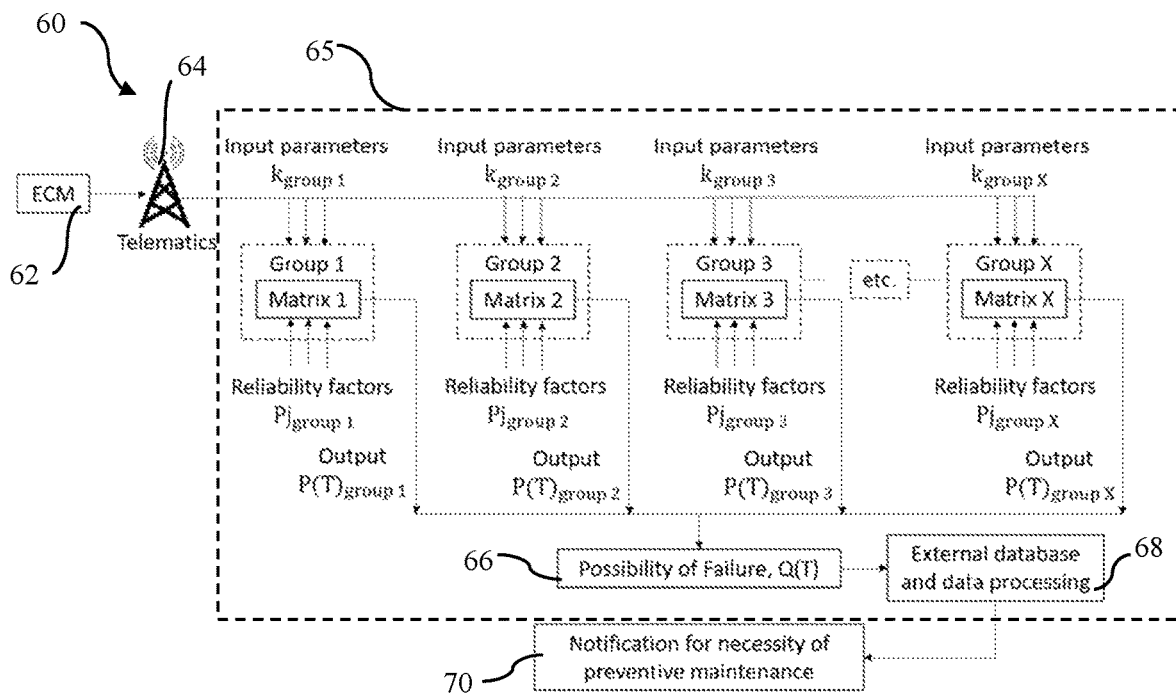
FIG. 5 is a diagram illustrating a system and methodology of a standalone version in an embodiment described herein.

As noted above, the present invention may be implemented as a stand-alone unit that is associated with the database having the performance data of the components of each of the groups previously defined. Specifically, FIG. 5 illustrates a system and methodology of a standalone version 60. Specifically, the ECM 62 of the vehicle may send performance data of the components thereof via telematics 64 or other communication protocol to an external database, such as at an external data processing center. The external database may then be scanned via a scanning step 65 for performance data of all of the various components of each of the groups defined for the overall system, such as, for example, the vehicle powertrain, detailed as Group 1, Group 2, Group 3, through Group X. Matrices for each of the groups may be generated, such as Matrix 1 corresponding to Group 1, Matrix 2 corresponding to Group 2, Matrix 3 corresponding to Group 3, and Matrix X corresponding to Group X. The input parameters may be assigned to the (k) columns of each group's matrix. The input parameters in the (k) columns for each of the components may be assigned as either a zero (0), depending on whether the specific input parameter does not lead to the failure of the associated component over a time period T, or a one (1), depending on whether the specific input parameter does lead to the failure of the associated component over a time period T. As noted above, individual parameters within groups may be linked in parallel or in series depending on whether the failure of a specific component can or cannot be potentially set by the specific (k) parameter, and the values thereof may be set accordingly.

Once the matrices for the groups are created and the parameters filled, the reliability factor ($P_j$) of each group may be utilized to calculate a probability of failure P(T) for each group of components. Each of the probable reliabilities P(T) for each group may then be multiplied together to arrive at a possibility of failure Q(T) for the overall system via a possibility of failure Q(T) step 66. Q(T) may be compared to $Q(T)_{critical}$ to determine whether the possibility of failure equals or is greater than the threshold previously determined via external database and data processing step 68. If Q(T) is equal to or above $Q(T)_{critical}$, then notification is generated for the necessity of preventive maintenance via notification for necessity of preventive maintenance step 70.

Figure 6:
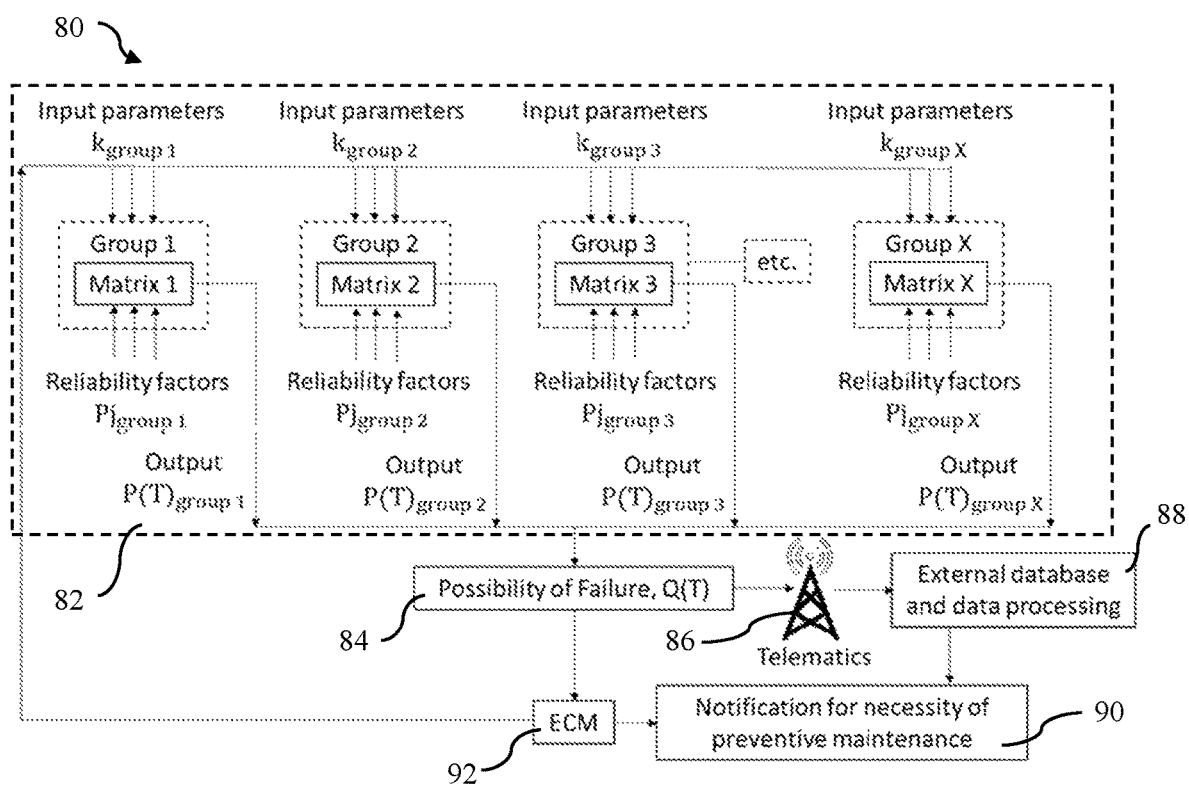
FIG. 6 is a diagram illustrating a system and methodology of an onboard version in an embodiment described herein.

FIG. 6 illustrates a system and methodology of an onboard version 80. Specifically, as illustrated in FIG. 6, ECM may compile performance data in an onboard database. The database may then be scanned for performance data of all of the various components of each of the groups defined for the overall system via scanning step 82, such as, for example, the vehicle powertrain, namely Group 1, Group 2, Group 3, through Group X, depending on the number of groups defined. Matrices for each of the groups may be generated, namely Matrix 1 corresponding to Group 1, Matrix 2 corresponding to Group 2, Matrix 3 corresponding to Group 3, and Matrix X corresponding to Group X. The input parameters may be assigned to the (k) columns of each group's matrix. The input parameters in the (k) columns for each of the components may be assigned as either a zero (0), depending on whether the specific input parameter does not lead to the failure of the associated component over a time period T, or a one (1), depending on whether the specific input parameter does lead to the failure of the associated component over a time period T. As noted above, individual parameters within groups may be linked in parallel or in series depending on whether the failure of a specific component can or cannot be potentially set by the specific (k) parameter, and the values thereof may be set accordingly.

Once the matrices for the groups are created and the parameters filled within each matrix, the reliability factor (Pj) of the components may be utilized to calculate a reliability of each group, which in turn may be utilized to calculate a probability of failure P(T) for each group of components. Each of the probable reliabilities P(T) for each group may then be multiplied together to arrive at a possibility of failure Q(T) for the overall system via possibility of failure Q(T) step 84. Q(T) may be compared to $Q(T)_{critical}$ to determine whether the possibility of failure equals or is greater than the threshold previously determined. If Q(T) is equal to or above $Q(T)_{critical}$, then communication may be sent via telematics 86 or other communication protocol to an external database for an external database and data processing step 88. Notification 90 may be generated for the necessity of preventive maintenance via notification for necessity of preventive maintenance step 90. The notification may be generated by either the external database and data processing center or may be generated directly by the ECM 92 in response to the determination of a critical possibility of failure.

We claim:

1. A method for determining reliability of a vehicle powertrain comprising:

providing a vehicle powertrain comprising a vehicle power cylinder and an air/exhaust system, wherein the vehicle power cylinder comprises a first group of components and the air/exhaust system comprises a second group of components, wherein each component of the first and second groups of components comprises an associated monitor or sensor structured to monitor or sense performance data of each component associated therewith;

providing a control module having a communications interface structured to communicate with each monitor or sensor associated with each component of the first and second groups of components to facilitate acquiring the performance data of each component of the first and second groups of components;

providing a diagnostic tool and monitoring the first group of components of the vehicle power cylinder and the second group of components of the air/exhaust system using each associated monitor or sensor of each component of the first and second groups of components for reliability of each component of the first and second groups of components to capture the performance data of each component of the first and second groups of components;

compiling the reliability performance data of each component of the first and second groups of components from the control module diagnostic tool into a database;

providing a scanner and scanning the complied reliability performance data and monitoring the reliability of each component of the first and second groups of components, assigning an input parameter to each component of the first and second groups of components based on the reliability performance data, determining a reliability factor for each of the first and second groups of components based on the input parameter of each of the components within each of the groups being assigned a binary value of either one (1) if failure of the associated component is indicated and zero (0) if no failure is indicated, the number of components in the group, the identity of each component and the reliability of each component in each of the groups, determining a probability of failure of each of the first and second groups;

multiplying the probability of failure of each of the first and second groups to determine the possibility of failure of the vehicle powertrain; and in response to the probability of failure being equal to or is greater than a threshold generating a notification for the necessity of preventative maintenance.

2. The method of claim 1, wherein the database is associated with a processing center that is external to the system.

3. The method of claim 1, further comprising the steps of:
providing a control module associated with the system; and
sending the reliability performance data of the plurality of components from the first and second groups to an external processing center.

4. The method of claim 3, wherein the scanner scans the reliability performance data of the plurality of components at the external processing center.

5. The method of claim 3, wherein the control module is configured to create the database of the reliability performance data from the plurality of components.

6. The method of claim 5, further comprising the step of:
assigning the input parameter of each of the plurality of components from the first and second groups using at least one of a signal, flag, and a pre-fault from the associated monitors or sensors diagnostic tool.

7. The method of claim 1, further comprising the steps of:
forming a first and second matrix from the reliability performance data, each matrix comprising of each of the components corresponding to each of the first and second groups respectively; and
each matrix having a column for the input parameters for each of the associated components from each of the first and second groups.

8. The method of claim 7 further comprising the steps of:
assigning a critical failure threshold; and
repairing the vehicle powertrain if the possibility of failure is greater than the critical failure threshold.

* * * * *